Figure 1:
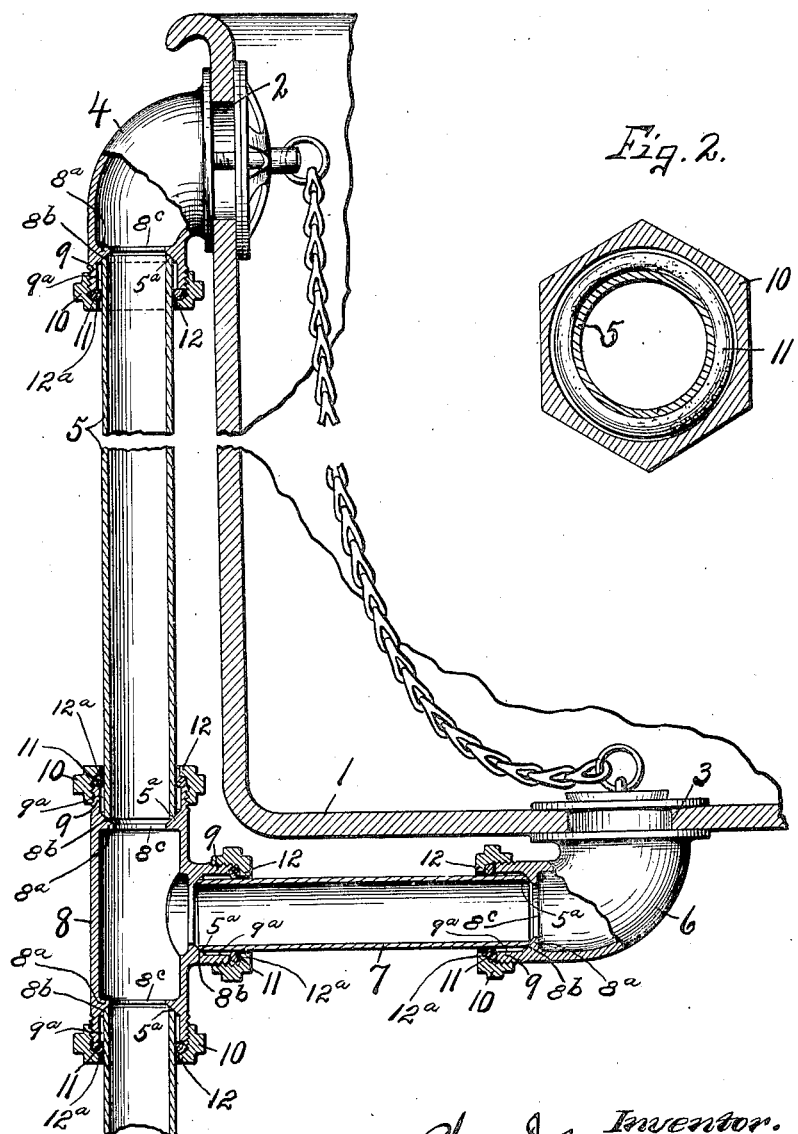

C. D. MILNE.
SLIP JOINT FOR PIPES.
APPLICATION FILED MAR. 16, 1908.

936,469.

Patented Oct. 12, 1909.

Witnesses,
E. C. Thomas
H. E. Chase

Inventor.
Chas. D. Milne
By Howard P. Denison
Attorney.

UNITED STATES PATENT OFFICE.

CHARLES D. MILNE, OF CATTARAUGUS, NEW YORK, ASSIGNOR TO CENTURY BRASS MANUFACTURING COMPANY, OF CATTARAUGUS, NEW YORK, A CORPORATION OF NEW YORK.

SLIP-JOINT FOR PIPES.

936,469.  Specification of Letters Patent.  Patented Oct. 12, 1909.

Application filed March 16, 1908. Serial No. 421,473.

*To all whom it may concern:*

Be it known that I, CHARLES D. MILNE, of Cattaraugus, in the county of Cattaraugus, in the State of New York, have invented new and useful Improvements in Slip-Joints for Pipes, of which the following, taken in connection with the accompanying drawings, is a full, clear, and exact description.

This invention relates to certain improvements in slip joints for pipes and is particularly useful in connection with the drainage and over flow pipes of bath tubs and similar fixtures where the angle between the pipe and portion of the fixture to which it is attached varies more or less with different fixtures.

It is well known that the end and bottom of bath tubs and similar fixtures having over flow and drainage pipes connected to each other vary more or less in their relative angles of inclination to and from a vertical or horizontal plane and that these pipes are usually provided with terminal elbows or angles rigidly screwed or otherwise secured thereto and that the tee or junction of the over flow and drainage pipe is also rigid therewith thus holding the pipes at substantially right angles to each other and that when attaching these rigid connections to the end and bottom of the bath tub or similar fixture in which the angles of such ends or bottom vary from a vertical or horizontal position, it is often very difficult to make the connection between the pipe and fixture without over-straining the parts or leaving a more or less open joint which is not only objectionable in appearance but frequently causes leakage.

My main object, therefore, is to provide the angles such as the elbows or tees of such pipe with flexible slip joints which are not only water tight but allow a limited lateral adjustment of the elbows, tees or pipes relatively to each other in all radial directions so that the attaching elements of the pipe or pipes may be properly secured to the fixture without over-straining any of the joined parts or leaving any of the joints open.

Another object is to provide each slip joint with a flexible ring of circular cross section to serve the double purpose of a water tight packing and also as a yielding roller bearing between the jointed parts of the pipe so that said parts may be rocked laterally to conform to any reasonable variation in the parallelism between the pipe and fixture.

Another object is to provide each fitting such as the elbow or tee with a concave abutting face or shoulder concentric with the center of oscillation of the pipe or fitting and against which the adjacent end of the pipe is adapted to abut so that when the joined parts are adjusted or rocked relatively to each other the abutting faces will be maintained in close contact to each other to reduce the liability of leakage at this joint.

Other objects and uses relating to specific parts of the slip joints will be brought out in the following description.

Figure 2:
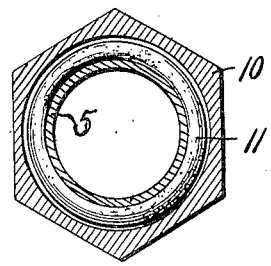

In the drawings—Figure 1 is a sectional view of one end of a bath tub showing the over flow and drainage pipes joined to each other and to the adjacent end and bottom of the bath tub, said pipes and their fittings being shown in section although the elbows are shown partly in elevation. Fig. 2 is an enlarged transverse sectional view through one of the slip joints.

In order to demonstrate the practicability of my invention, I have shown one end of a bath tub —1— as provided with an over flow opening —2— and a drainage opening —3—. The over flow opening —2— communicates with an elbow or angle fitting —4— which is flexibly mounted upon the upper end of an upright over flow pipe —5—. The drainage opening —3— communicates with a similar elbow or angular fitting —6— which is also connected by a slip joint to a substantially horizontal drainage pipe —7— which in turn is connected to the upright over flow pipe —5— by a tee fitting —8—.

One terminus of each of the fittings 4 and 6 and each terminus of the fitting 8 is provided with an inwardly-extending angular flange 8$^a$ having its outer face beveled as at 8$^b$ and forming a contracted opening 8$^c$. That terminus of each of the fittings 4 and 6 provided with an inwardly-extending angular flange and each terminus of the fitting 8 is provided with an exteriorly threaded nipple 9 to which is attached a threaded sleeve or packing nut 10 having its outer end, as at 12 inturned so as to project over and beyond the outer edge of a nipple 9.

The inner face of the portion 12 of the nut 10 is grooved, as at 12ᵃ to provide a bearing surface or seat for a yielding ring 11 which is mounted upon the outer edge of the nipple 9 and engages the bearing surface formed by the groove 12ᵃ. In cross section the body portion of the ring 11 is cylindrical and of such diameter as to project past the inner face of the nipple and the inner face of the portion 12. The elements 8ᵃ, 9, 10 and 11 constitute a flexible slip joint for the end of a pipe. In this connection it will be stated that each of the pipes 5 and 7 is connected to its fittings by a flexible slip joint constructed in a manner as set forth, the ends of the pipe being beveled as at 5ᵃ and mounted against the beveled surface 8ᵇ of the flange 8ᵃ, said beveled face constituting a seat. The inner diameter of each nipple 9 is the same as the inner diameter of the fitting and the inner diameter of the inturned portion 12 of the nut, sleeve or collar 10 substantially the same as the inner diameter of the fitting. The inner diameter of the nipple is greater than the diameter of the pipe 5 whereby a space 9ᵃ is provided between the pipe and the nipple. The inner diameter of the ring 11 is greater than the inner diameter of the pipe 5 and owing to this manner of setting up the ring 11 with respect to the pipe, when the pipe is positioned, the ring will be compressed so as to snugly engage the pipe thereby preventing leakage even though the joint is a flexible one. The manner of setting up the nipple 9 and nut or collar or sleeve 10 with respect to the pipe 5, that is to say, owing to the inner diameters of the nipple and nut with respect to the diameter of the pipe 5, a limited radial adjustment or rocking movement of one of the jointed parts is had upon the other, although the packing ring 11 fits snugly around the pipe and positioned at the end of the nipple 9.

As previously stated the interior diameter of the annular shoulder —12— is somewhat greater than the exterior diameter of the adjacent portion of the pipe which passes therethrough leaving an intervening space to permit the joined parts to be rocked laterally one upon the other and at the same time the packing —11— forms a yielding annular bearing for the pipe to permit such adjustment and still maintain a water tight joint between the fitting and pipe. The concave annular shoulder —12— forms a seat or bearing for the end of the adjacent pipe so that when the parts are assembled and tightened in the manner described by the adjusting nut or collar —10—, the fitting or pipe may be rocked relatively to each a limited distance to enable the fitting to be properly adjusted to the fixture. In like manner the elbow —6— is connected by a slip joint to the pipe —7—, said slip joint consisting of a threaded nipple —9—, collar or sleeve —10—, and interposed flexible packing —11— similar to the corresponding parts previously described, it being understood that the inner diameter of the nipple 9 and nut, collar or sleeve 10 of the elbow 6 is somewhat greater than the exterior diameter of the inclosed portion of the pipe —7— leaving a sufficient intervening space to permit the elbow —6— and pipe to be rocked relatively to each other upon the bearing —11— so that the fitting —6— may be properly adjusted to closely fit against the adjacent portion of the fixture —1—. The opposite ends and branch of the tee fitting —8— are also provided with threaded nipples —9— collars —10— and packing —11— of substantially the same construction as described for the fittings —4— and —6— and in as much as these nipples, collars and packings are for the purpose of forming a flexible slip joint there, the interior diameters of the nipples —9— and collars or sleeves —10— are somewhat greater than the exterior diameter of the inclosed portions of the pipes which enter the same so as to leave ample intervening space for the united parts to be rocked one upon the other upon their respective yielding bearings —11— to compensate for any inequality in the parallelism of the pipes with the adjacent portion of the fixture.

It will be seen from the foregoing description that although I may employ each of these flexible slip joints in the elbows —4— and —6— and tee —8— the invention is not confined to the use of a plurality of such fittings but rather to the use of a single fitting involving a pipe and fitting flexibly mounted thereon with an interposed yielding packing of rounding cross section upon which the joined parts may be rocked radially a limited distance relatively to each other.

What I claim is:

1. A slip joint comprising the combination with a fitting having one terminus thereof provided with an inwardly-extending annular flange with the outer face thereof beveled, said fitting furthermore provided with an exteriorly threaded nipple integral with and projecting from the flanged end of the fitting, a packing nut engaging said nipple and having an inturned portion at its outer face overlapping and spaced from the outer edge of the nipple, a yieldable ring interposed between the inturned portion of the nut and the outer edge of the nipple, the inner diameter of said nipple being greater than the inner diameter of said ring and the inner diameter of said inturned portion of the nut being greater than the inner diameter of said ring, said beveled face of said flange providing a seat for one end of the pipe which is to be jointed to the fitting, the inner diameter of said ring being greater than the inner diameter of the pipe.

2. A slip joint for pipes comprising a fitting provided at one end with an externally-threaded nipple, an inwardly-extending flange constituting a seat, a packing nut mounted upon said nipple and provided at its outer face with an inturned portion extending over and spaced from the outer edge of said nipple, the inner face of said inturned portion being curved, and a yieldable ring interposed between the outer edge of the nipple and the inner face of said inturned portion, the inner diameter of said nipple being greater than the inner diameter of said ring, the inner diameter of said inturned portion being greater than the inner diameter of said ring, said seat adapted to have mounted thereon the end of a pipe to which is connected the fitting and the inner diameter of said ring being greater than the inner diameter of the pipe.

3. A slip joint for pipes comprising a fitting provided at one end with an externally-threaded nipple, an inwardly-extending flange constituting a seat, a packing nut mounted upon said nipple and provided at its outer face with an inturned portion extending over and spaced from the outer edge of said nipple, and a yieldable ring interposed between the outer edge of the nipple and the inner face of said inturned portion, the inner diameter of said nipple being greater than the inner diameter of said ring, the inner diameter of said inturned portion being greater than the inner diameter of said ring, said seat adapted to have mounted thereon the end of a pipe to which is connected the fitting and the inner diameter of said ring being greater than the inner diameter of the pipe.

In witness whereof I have hereunto set my hand this 16 day of January 1908.

CHARLES D. MILNE.

Witnesses:
F. E. JOHNSON,
J. J. McCARTHY.